UNITED STATES PATENT OFFICE.

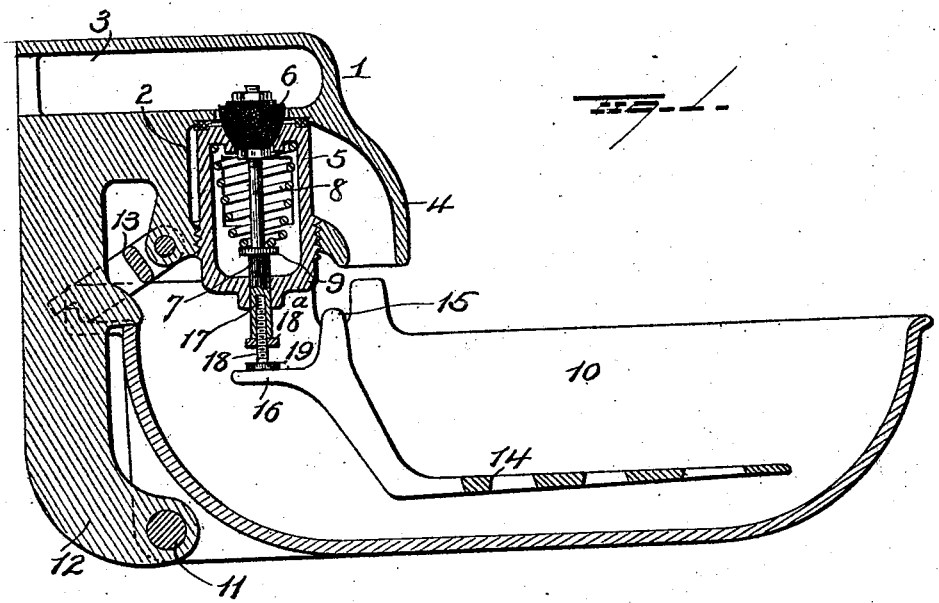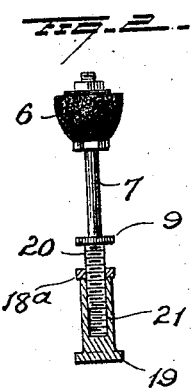

HUGO C. RASSMANN, OF BEAVER DAM, WISCONSIN, ASSIGNOR TO F. RASSMANN MANUFACTURING COMPANY, INC., OF BEAVER DAM, WISCONSIN.

WATERING DEVICE FOR CATTLE.

1,417,688.

Specification of Letters Patent. Patented May 30, 1922.

Application filed February 11, 1921. Serial No. 444,183.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle, and more particularly to such as embody a valved fount, a bowl into which said fount is adapted to discharge and an animal-controlled lever for opening the valve of the valved fount,— one object of my present invention being to provide simple and efficient means, in a watering device where the animal-controlled lever is sustained in operative position in the bowl by the spring-actuated valve of the valved fount, for easily and quickly adjusting said lever to the proper height in the bowl.

With this and other objects in view, the invention consists in certain novel features of construction and combinations of parts as hereinafter set forth and pointed out in the claims.

In the accompanying drawings; Figure 1 is a sectional view of a watering device embodying my improvements, and Figure 2 is a view of a modification.

1 represents a fount having a chamber 2, an inlet passage 3 and a spout 4. A valve cage 5 is located in the chamber 2 and provided at its upper end with a seat for a valve 6, and the cage 5 is constructed with suitable openings communicating with the chamber 2 so that water may pass from the passage 5 through the chamber 2 and finally out through the spout 4.

The valve 6 is carried by a stem 7 which extends downwardly through and beyond the bottom of the cage 5. The valve is held in a normally open position by the action of a spring 8 located within the cage 5, the upper end of said spring bearing against the upper end portion of the cage and its lower end bearing upon a ring 9 supported on the valve stem.

A bowl 10 is supported in position to receive water from the fount. In the drawing, I have shown the bowl as being pivotally mounted at 11 on an arm 12 depending from the fount and normally held in a horizontal position by a latch 13, but it is not essential for the purpose of my present invention, that the bowl should be supported in the manner above described, but may be supported in fixed position.

An animal-controlled lever 14 is located in the bowl and is pivotally supported as indicated at 15,—said lever being provided with an arm 16 which projects rearwardly below the valve stem of the valved fount.

The animal-controlled lever will be held in position in the bowl to be operated by an animal, by the spring-actuated valve stem, and in order that said lever may be easily and quickly adjusted so that it may be made to assume the proper position within the bowl with relation to the bottom thereof, the devices now to be described may be employed.

In the embodiment of my invention shown in Figure 1, the lower end portion of the valve stem is provided with a socket 17, the wall of which is threaded, and entering into this socket, is a threaded rod or member 18. This rod or member extends below the lower end of the valve stem and may be provided with a head 19 to rest on the arm 16 of the animal-controlled lever.

The threaded member 18 constitutes connecting means between the animal-controlled lever and the valve stem and by adjusting this member relatively to the valve stem, the animal controlled lever may be easily and quickly adjusted when necessary, to properly position the same within the bowl. When adjusted, the member 18 may be held against accidental displacement by means of a jam nut 18ª.

Instead of providing the valve stem with a socket to receive the threaded adjusting member, the lower portion of the valve stem may be threaded externally as at 20 and the adjusting member may be made tubular as at 21 and internally threaded to receive the externally threaded portion of the valve stem, as shown in Figure 2.

Having fully described my invention what I claim as new and desire to secure by Letters-Patent, is:—

1. In a watering device, the combination with a valved fount including a spring-actuated valve, a bowl, and an animal-controlled lever normally sustained in operative position by the stem of said spring-actuated valve, of adjusting means for said lever comprising a member having threaded connection with the valve stem and engaged by a part of said animal-controlled lever within the bowl.

2. In a watering device, the combination with a fount, a bowl, and a pivoted animal-controlled lever located in the bowl and having an arm, a valve for said fount, a stem depending from said valve, and an adjusting member between the lever arm and the valve stem normally within the bowl, said valve stem and adjusting member having threaded portions and one of said parts telescoping relatively to the other, whereby said adjusting member is connected with the valve stem in position to receive the lever arm.

3. In a watering device, the combination of a valved fount embodying a valve having a depending stem, the lower portion of the latter having a socket with a threaded wall, a bowl, an animal-controlled lever in the bowl, said lever having an arm within the bowl, and an adjusting member threaded into the socket in the valve stem and depending from the latter in position normally to receive the arm of the lever within the bowl.

In testimony whereof, I have signed this specification in the presence of two subscribing witnesses.

HUGO C. RASSMANN.

Witnesses:
A. B. CHANDLER,
E. J. LAWRENCE.